Patented Dec. 6, 1949

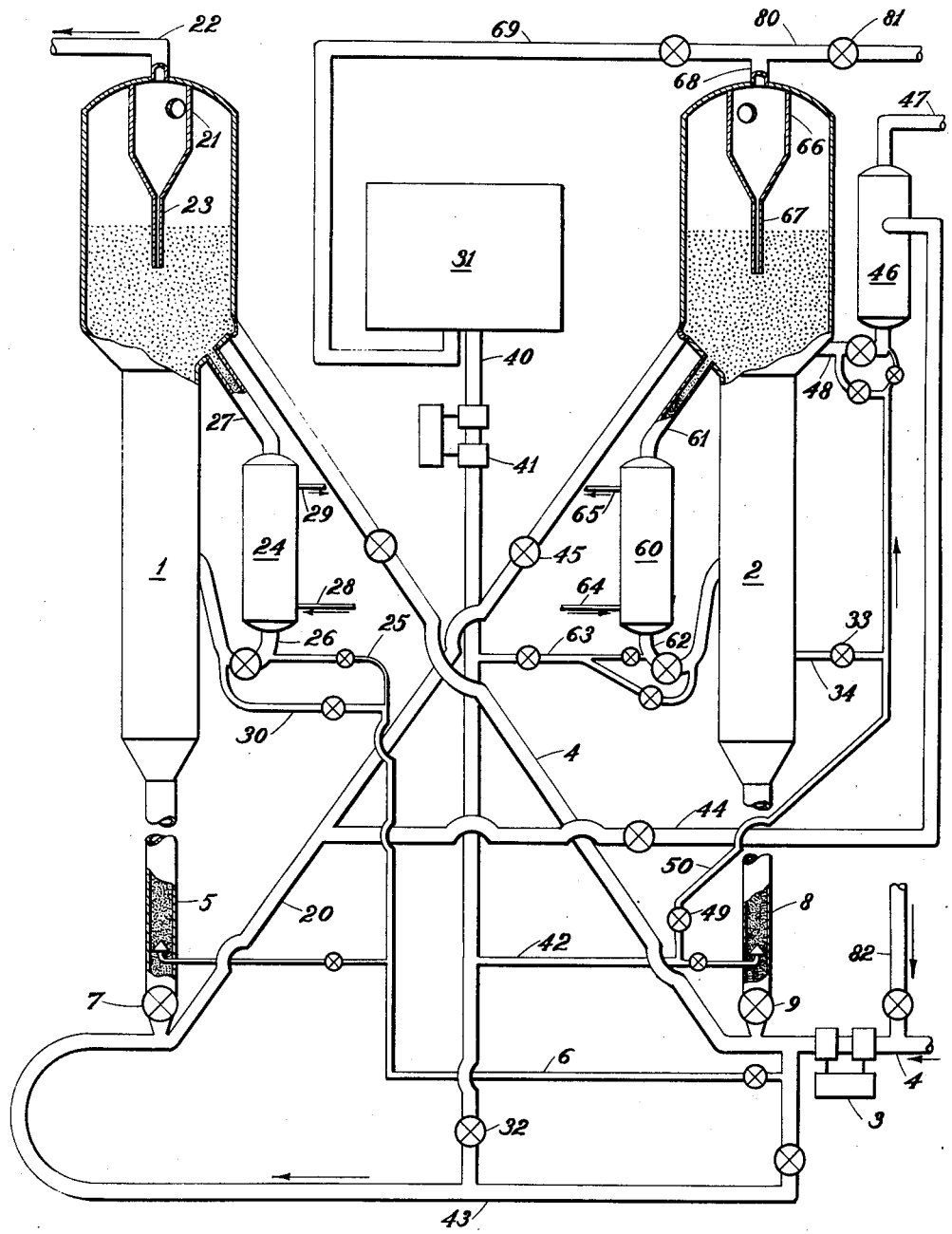

2,490,587

UNITED STATES PATENT OFFICE 2,490,587

MANUFACTURE OF OXYGEN

Celeste M. Fontana and Everett Gorin, Dallas, Tex., assignors, by mesne assignments, to Socony-Vacuum Oil Company, Incorporated, New York, N. Y., a corporation of New York Application August 7, 1944, Serial No. 548,350

12 Claims. (Cl. 23—221)

This invention relates to the production of oxygen from air. More particularly this invention relates to a continuous process for producing oxygen by absorbing oxygen from the air in carrier mounted cuprous chloride or carrier mounted cuprous chloride-alkali metal chloride mixtures, particularly cuprous chloride-potassium chloride mixtures, in an absorption zone and subsequent desorption of oxygen from the absorbent agent in a separate zone.

Oxygen as a reagent is assuming ever increasing importance in the fields of organic and petroleum chemistry. It is especially valuable as a reagent for numerous high temperature reactions of the light paraffin hydrocarbons. However, its use for this purpose has been restricted up to the present because of high cost of preparing oxygen by fractionation of liquid air. A few of the interesting reactions which may be carried out with oxygen as a reagent are: the catalytic oxidation of methane to carbon monoxide and hydrogen; the partial combustion of methane and other light hydrocarbons to form acetylene; the partial combustion of ethane and propane to form ethylene and the oxidation of light paraffins to aldehydes, ketones, alcohols and acids.

Numerous methods have been proposed in the prior art for the preparation of oxygen from air. These methods fall into two general categories, viz., those involving physical methods of separation, such as liquefaction followed by fractionation of the liquid air, and those involving chemical methods, such as absorption and desorption of oxygen by chemical oxidation and reduction reactions. The earliest method of manufacturing oxygen involved absorption from air on barium oxide to form barium peroxide, followed by desorption of the oxygen at elevated temperatures. This method proved cumbersome in practice because of high temperatures involved and the necessity of removing carbon dioxide from the air feed and hence, has been commerically abandoned in favor of the liquefaction method. However, the liquefaction method is intrinsically expensive, involving high pressure refrigeration equipment, and its replacement by some more economical procedure would be desirable.

A primary object of the present invention is to provide an improved and economical method of producing oxygen from the air. Another object is the provision of a continuous method of producing oxygen by absorption and desorption of carrier mounted copper salts, particularly carrier mounted copper chlorides. Still another object is the continuous production of oxygen by use of copper chlorides and their potassium chloride melts or other alkali metal chloride melts mounted on suspended inert powers as a carrier means in absorption and desorption zones and as transfer media between said zones. Additional objects of the invention will become apparent from the description thereof and from the appended claims.

As pointed out in the co-pending applications of Everett Gorin, entitled Recovery of halogens, Serial No. 507,616, now abandoned, and Acid recovery process, Serial No. 507,617, filed October 25, 1943, now Patent No. 2,418,930, cuprous chloride may be converted to the cupric oxide-cupric chloride complex form by reacting the molten chloride with air according to the following equation:

(1) 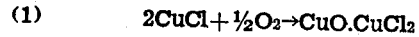
$$2CuCl + \tfrac{1}{2}O_2 \rightarrow CuO.CuCl_2$$

The molten mass containing the complex "oxychloride" may be heated to make oxygen and reconvert the mass to cuprous chloride according to the equation:

(2) 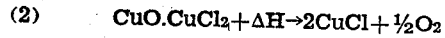
$$CuO.CuCl_2 + \Delta H \rightarrow 2CuCl + \tfrac{1}{2}O_2$$

As indicated hereinabove the present invention involves the use of inert carriers, preferably in the form of powders, as supporting media and transfer media for alkali metal chloride-copper chloride melts or copper chloride melts in a continuous process for producing relatively pure oxygen from the air. Materials which may be used as supports are powdered pumice, natural clays such as kieselguhr, silica gel, alumina gel and also the so-called aerogels of extremely high porosity and low density. The particle size of these materials may vary from 10 microns in diameter or less to about 10 mesh size.

In carrying out the different steps of the process the powder with reactive salt mounted thereon is maintained in so-called hindered flow, the powder being suspended by passing a gas therethrough at such a velocity that there results a fluid mass having the flow and heat transfer characteristics of a liquid. Linear velocities within the range of ¼ to about 5 ft./sec. of gas through the powdered mass are satisfactory to produce the desired liquid mass characteristics. In order to minimize the amount of solid carried overhead with the gas stream the particle size should not be less than 10 microns and preferably not less than 50 microns in maximum diameter. Uniform and complete distribution of gas throughout the fluidized bed requires an upper limit of approximately 20 mesh particle size. However, a minor percent of the granules may be somewhat larger but should pass through a 10 mesh screen.

Several methods may be used in preparing the supported chlorides of copper for use in the improved continuous process for the manufacture of oxygen; the copper salts may be used in admixture with potassium chloride or other alkali metal halide to form impregnating melts; the copper salts may be used as such in molten condition to impregnate the supporting powder; the copper salts with or without alkali halide such as potassium chloride may be mixed with the powder support in a liquid medium such as water or alcohol to form a "mud" which may be dried and repowdered, or the copper salts, with or without potassium chloride in admixture therewith may be added to the carrier by immersing the same in aqueous solutions containing these salts followed by removal of the solvent by evaporation.

For example, cuprous chloride may be supported on silica or alumina as follows. Hydrogels of cupric hydroxide and silica or alumina may be prepared separately and the wet hydrogels ball milled together to produce the intermediate composite. The composite may then be dried and treated with hydrogen chloride to form gel supported cupric chloride, which may be reduced to the cuprous form by heating, preferably in the presence of a reducing agent such as methane. The cupric hydroxide gel may be prepared by controlled addition of ammonia to a cupric acetate solution. Various methods, well known to the art may be used to prepare silica gel or alumina gel. If desired, cupric hydroxide and the supporting oxide or hydroxide may be coprecipitated to obtain a uniformly dispersed mixture. For example, a solution of sodium silicate may be added to a solution of cupric nitrate to produce a coprecipitated hydrous mass containing silica and copper oxide. A mixture of copper hydroxide and aluminum hydroxide likewise may be precipitated by the addition of a solution of sodium carbonate to a solution of the mixed nitrates. Following coprecipitation the gel masses are washed and dehydrated to form intimate mixtures of the oxides. If desired, these gel supported copper oxides may be impregnated with aqueous solutions of alkali metal chlorides, such as potassium chloride or sodium chloride, to form gel supported intimately mixed copper oxide-alkali metal chloride mixtures. The supported active material preferably should contain from 20 mole percent to 50 mole percent of alkali metal chloride. These are treated with hydrogen chloride to convert the copper oxide to cupric chloride which may be reduced to the cuprous chloride. The partial reduction may be accomplished by heating the mass to temperatures above about 500° C. or by contacting with hydrocarbon vapor at temperatures of about 450° C. to 500° C.

The rate of absorption of oxygen from the air by cuprous chloride is greatly increased by the presence of from about 20 to 50 mole percent of alkali metal chloride as described in the co-pending application of C. M. Fontana, entitled Oxygen absorption media Serial No. 548,349, filed August 7, 1944, now Patent No. 2,447,323. Hence, in making up supported copper chloride reactant, aqueous solutions containing from 20 to 50 moles, preferably 25 to 45 moles of potassium chloride or other alkali metal chloride per 100 moles of total alkali metal chloride-cupric chloride salts may be used for impregnating the inert carrier. To the solution of salts so prepared is added sufficient inert supporting material, such as natural clays, gels, etc., to form a heavy slurry. The slurry may also be formed by wetting an intimate mixture of the chloride salts with pulverized inert support. The slurry is filtered or decanted to remove superficial solution if necessary and the impregnated carrier is dried, crushed and sized to the desired size. In order that the impregnated powdered carrier be suitable for hindered flow operation the powder must be a free flowing, non-packing solid at the maximum temperature of operation, that is at temperatures up to 550° C. Since the amount of melt on the carrier is usually no more than 65% of the total weight of the impregnated powder, preferably from 20% to 65%, the property of existing as a free flowing non-packing solid is readily obtained.

Referring now to the drawing which is a schematic diagram of the apparatus for carrying out the invention, towers 1 and 2 are oxygen absorbing and oxygen desorbing zones respectively. Tower 1 is partially filled with preheated powdered porous carrier impregnated with potassium chloride, cuprous chloride and cupric chloride as hereinabove described and tower 2 is partially filled with the hot desorbed impregnated powder. The temperature of the powdered mass in tower 1 in starting the operation should be above about 250° C. preferably above 300° C. The reaction taking place in this tower, that is the oxidation of the cuprous chloride as described by Equation 1 above, is exothermic and hence, the temperature rises as air is passed via compressor 3 in line 4 to tower 1. For on stream operation the preferred temperature of the aerated powder in tower 1 is within the range of from about 325° C. to about 425° C. Air is also passed to standpipe 5 at the base of tower 1 via valved line 6 in order to obtain fluid flow conditions therein, thereby facilitating flow of oxidized solid to valve 7 for injection and transfer to desorption tower 2 hereinafter described. If desired, oxygen instead of air may be introduced as fluidizing gas to standpipe 5 from line 40 (by a line not shown) in order to avoid nitrogen diluent in the final product.

The density of the fluidized solid in the dense phase will depend on the settled density of the impregnated carrier. The settled density may vary from 15 to 120 pounds per cubic foot depending on whether a relatively low density carrier such as kieselguhr or a high density carrier such as alumina gel is utilized. A second factor influencing dense phase density of material of a given particle size is the lineal velocity of the suspending gas. We have found that the density in the dense phase for suitable operation will range from about 0.2 to about 0.7 times the density of the settled powder. We have also found that the density of the powder in standpipes and coolers, wherein the lineal velocity of the suspending gas is usually within the range of 0.025 and 0.20 feet per second, is from about 0.7 to about 0.9 times the settled density of the powder. For ideal operation the rarified or dilute phase may contain as little as 25 or 50 grains of powder per cubic foot. Usually the density will range from one or two pounds per cubic foot down to this low figure.

As air is forced through line 4, there is injected therein desorbed powder as a result of the pressure head in standpipe 8 at the base of tower 2. The rate of supply of desorbed powder to line 4 is regulated by means of control valve 9. Thus a continuous supply of desorbed powder is fed to tower 1 as oxygen enriched powder is withdrawn in approximately equal amount from tower 1 via standpipe 5, control valve 7 and line 20 as hereinafter described.

As the air passes up through the suspended powder mass in tower 1 at a velocity within the aforementioned range a pseudo interface, not unlike the surface of boiling liquid develops, above which the density varies from 1 to 2 pounds per cubic foot to the density of clear air or nitrogen depending on the amount of extremely fine material in the powder used and the extent of oxygen removal from the air feed. In the dense phase below the interface oxygen is absorbed from the air and residual oxygen depleted air passes upward from the interface and thence through cyclone separator 21 leaving the tower via line 22. Powdered reactant separated from the oxygen depleted exhaust air stream is returned to the dense phase via dip leg 23. Dip leg 23 in tower 1 and also dip leg 67 in tower 2 hereinafter described are equipped with valves (not shown) to control the flow of precipitated powder and prevent the escape of reactor gases therethrough. Accumulated powder in these dip legs is aerated with suitable aeration gas to produce fluid flow of the recovered powder to the main body of the reactor.

As mentioned hereinabove, the reaction in tower 1 is highly exothermic and hence the temperature of the fluidized mass tends to rise. It is desirable to hold the temperature in tower 1 below 425° C., preferably below 400° C. This may be accomplished by providing cooler 24, which may be, for example, a waste heat boiler. Hot powder fluidized by air from line 25 injected into line 26 at the base of exchanger 24 moves by gravity through line 27 and exchanger 24 and is carried back to tower 1 by air introduced from line 30, the rate of flow being adjusted by the valve in line 26. Cooling fluid, such as water, is introduced to exchanger 24 through line 28, and leaves the exchanger via line 29.

Passing now to the operation of desorption tower 2, oxygen from storage tank 31 is passed via line 40, provided with compressor 41, via line 43 and thence across the discharge outlet at the base of standpipe 5 to pick up oxygen enriched powder for transfer through line 20 to desorber 2. The rate of pickup of powder is regulated by control valve 7 at the base of standpipe 5. An inventory of oxygen is required for transfer of the enriched powder and for aeration of tower 2 and standpipe 8 at the base thereof. Oxygen for aerating standpipe 8 is passed from line 40 through valved line 42 for injection at a point near the base of the standpipe.

The use of any gas other than oxygen for aeration of the contents of tower 2 or any appurtenances thereof introduces contamination of the oxygen product, and hence relatively pure oxygen as an aeration means is highly desirable. However, inert gases easily separable, by physical methods, from the desorbed oxygen such as steam or carbon dioxide may be used as a suspending gas or even as a stripping gas to desorb oxygen in the main desorption zone in which case this foreign stripping gas could also be used as carrier gas in line 20. The use of steam will, however, introduce a small amount of hydrolysis and resultant production of hydrogen chloride contaminant in the product. It is also not necessary to use pure oxygen as a carrier for the enriched powder from tower 1 to tower 2. By proper adjustment of the valves in lines 4, 43 and 44, and by closing valve 45 in line 20 and valve 32 in line 40, compressed air may be used to pick up the enriched powder from the base of tower 1 for transfer to intermediate cyclone separator 46 wherein the powder is separated from carrier air which passes overhead via line 47, the enriched powder being delivered via aerated line 48 to desorption tower 2. A multiplicity of cyclone separators operated either in series, parallel or series-parallel may be used for this duty and if desired, Cottrell precipitators may also be used to recover suspended powder. The separated enriched powder may be delivered directly to tower 2 via aerated line 48, as described above for return of powder from cooler 24, or to one or more heat exchangers (not shown) to be raised in temperature before delivery to tower 2. Hence by use of air as the carrier gas, the amount of oxygen inventory necessary for carrying out the operation in tower 2 may thus be cut to a minimum. However, if air is used to transfer the enriched absorbent from reactor 1 to reactor 2, oxygen in addition to that required to aerate standpipe 8 will be required to operate tower 2 in hindered flow. This additional oxygen may be entered by opening the valve 49 in line 50 and valve 33 in aerating line 34. Additional oxygen aerating gas is also fed to tower 2 via powder return line 48 described above and line 62 described below.

The conditions of operation of tower 2 relative to gas velocities and densities of the gas-powder phases are approximately the same as those in tower 1, except as modified with respect to densities as a result of higher temperature levels in tower 2. The preferred operation temperature range of tower 2 is from about 475° C. to 525° C., although temperatures as low as 425° C. and as high as 550° C. may be used to desorb the enriched powder. The particular temperature required to desorb oxygen from the oxidized potassium chloride-copper chloride mass is a function of the amount of cupric oxide, potassium chloride and cupric chloride present. It is generally desirable to operate the desorption process in tower 2 so that solid cupric oxide or cupric oxychloride is always present in contact with the potassium chloride melt mounted on the carrier. Thus the fluid mass taken out of tower 2 through standpipe 8 should always have an appreciable oxygen content corresponding to from 1 to 8 moles of CuO per 100 moles of copper present. When solid CuO is present, the temperature required to desorb oxygen is lower the higher the cupric chloride content of the mass, the KCl content being maintained constant. The temperature required to desorb oxygen is also lower the higher the KCl content when the ratio of the number of moles of cupric chloride to the number of moles of potassium chloride is held constant. The amount of cupric chloride initially present should be between about 0.25 to 1.5 moles per mole of potassium chloride. The preferred range varies with the KCl content of the melt and lies, for example, between about 0.5 to 1 mole of cupric chloride per mole of potassium chloride when 30 mole percent potassium chloride melts are employed. During the various steps of the process the mole ratio of cupric chloride to cuprous chloride may vary from about 1 to 10 to about 10 to 1.

In order to raise the temperature of the powder to these higher levels in tower 2 and to furnish the necessary heat of desorption of the powder, heat exchanger 60, which may represent a multiplicity of heat exchanger units, is provided. Powder overflows from tower 2 through line 61, exchanger 60 and thence through return line 62, the system being aerated and the heated powder being returned by means of oxygen introduced to line 62 from line 40 via valved line 63. Heating fluid such as flue gas enters exchanger 60 through line 64 and leaves the heat exchanger apparatus, which may be in the form of a bank of heated furnace tubes, via line 65. As indicated hereinabove sufficient powder must be withdrawn from tower 2, reheated and returned thereto for maintaining the temperature in tower 2 within the approximate range of 475° and 550° C. If desired, at least a part of the heat necessary for raising the temperature of the absorbent and also to furnish the heat of desorption of the enriched absorbent in tower 2 can be supplied by way of preheating the oxygen used as transfer or aerating medium.

As the oxygen enriched impregnated powder in tower 2 undergoes desorption, oxygen freed from the powder and also aeration oxygen collects above the dense phase interface and passes to cyclone separator 66 wherein the major amount of suspended dust particles are removed and returned to the dense phase through dip leg 67. The purified oxygen stream passes via line 68 to oxygen storage tank 31 via valved line 69, a portion amounting to approximately the net make gas of the process, being diverted to product oxygen recovery through line 80 regulated by valve 81. The oxygen stream may be contaminated with a small amount, i. e., less than 1% of chlorine as hereinafter explained. The chlorine loss is due to slight decomposition of cupric chloride in the absorbent and is compensated for by intermittent or continuous introduction of a small amount of hydrogen chloride or chlorine to line 4 from line 82. The loss of chlorine may be eliminated almost completely by cooling the gas entering the cyclone separator 66 containing a small amount of suspended solid. Although cyclone separator 66 is shown as an internally located separator in the drawing it would be located external to reactor 2 when operating to recover chlorine by this method. The chlorine is reabsorbed on the solid cuprous chloride at the reduced temperature. A small amount of oxygen will likewise be reabsorbed but this will not appreciably lower the net rate of oxygen production.

When operating tower 1 and tower 2 at pressures near atmospheric pressure, the average residence time of the impregnated powder in each of these zones will be approximately within the range of 0.5 minute to 10 minutes. The reaction times are approximately directly proportional to the surface area exposed to absorption and desorption. The absorption rate will be approximately directly proportional to the partial pressure of oxygen in the air feed. Hence it is of advantage to carry out the absorption step in tower 1 under superatmospheric pressure, under which conditions desorption may be obtained in tower 2 at temperatures as low as 425° C.

Although the above description of the operation of towers 1 and 2 has been for approximate atmospheric pressure operation or for only slightly superatmospheric pressure, for example, 5 to 10 pounds' gauge pressure, it is possible to operate the absorption tower at considerable higher pressure than the desorption tower, say under five to ten atmospheres of pressure or even twenty atmospheres while the desorption tower is operated at approximately atmospheric pressure. Such type of operation introduces a modification in the method of transferring the impregnated powder to and from high pressure tower 1. Operation at such elevated pressure makes possible the carrying out of the absorption step at higher temperatures, say 450° C. or even higher.

Various methods for continuously transferring finely divided solids to and from high pressure reaction zones, operation of which zones cooperates with atmospheric pressure operations, are well known to the art and hence such methods, are not fully described. One such method is described in U. S. Patent 2,274,003 to Bruce Sheppard. Such type of operation also reduces the heat requirements for the desorber 2 making unnecessary the use of heater 60 and also reduces the cooling requirements for absorber 1 and makes the process more nearly adiabatic.

Alternatively in the non-adiabatic mode of operation it may be advantageous to desorb the oxygen at somewhat elevated pressures, say 10 to 50 pounds' gauge or even higher. One advantage of this mode of operation is the higher oxygen to chlorine ratios that are obtained.

Numerous advantages are inherent in the hereinabove described process. One of the chief advantages is that of obtaining maximum area of absorbent surface exposure to the oxygen to be absorbed. Since the rate of absorption in a given reactor is proportional to the absorbent surface exposed in such reactor, the use of highly porous powders as carriers for the impregnated absorbent mixtures of copper chlorides with potassium chloride makes possible high capacities for relatively small reactor space.

A second advantage of using fluidized powder technique in producing oxygen from carrier-mounted copper chloride alone or in admixture with potassium chloride results from the high degree of uniformity of heat distribution characteristics of such type operation. Since the absorbent operation is highly exothermic it is highly desirable that the heat produced be dispersed throughout the reaction mass in order to avoid development of localized overheated zones. Closely related to the uniform heat distribution characteristics are the excellent heat transfer properties of such a fluidized solid mass. Considerable heat must be transferred to and from the absorbent in the hereinabove described process and relatively high heat transfer rates may be realized between the fluidized powders and the gases, either in direct heat transfer or in indirect heat transfer across exchanger walls. A further advantage in the use of powdered supports for the above absorbent results from the relatively simple means of transfer of absorbent between the reaction zones made possible by the suspendibility of such powder in the air feed to the process.

There is still an additional advantage of using a powder support for the highly absorbent copper chloride salts in carrying out the above process. As indicated by equation 1 above, the absorption of oxygen by cuprous chloride results in the formation of cupric oxychloride, $CuO \cdot CuCl_2$ from which cupric oxide will separate if the concentration of the cupric oxide in the mixture exceeds the solubility of the same in said mixture. The use of a powdered solid support furnishes a retaining means for the separated cupric oxide thereby keeping the same in close contact with the cupric chloride component of the complex, which intimate contact is essential for the desorption of oxygen from cupric oxide in the desorption zone. Because of this advantage it is possible to operate with copper oxide always present in the desorption step, which we have found to be advantageous in keeping the chlorine contamination in the product at a low value.

While we have described our process of contacting a finely divided copper chloride-alkali metal halide impregnated carrier with air in towers adaptable to "hindered flow" operation we do not wish to be limited to the use of such towers. The reaction rate for the oxidation step is sufficiently high to make possible the carrying out of such steps in an elongated pipe coil wherein the powder is carried along in continuous flow, the air being used as the carrier gas. Hence, a combination hindered flow-linear flow system of reactors may be used for carrying out the process. We may also operate the oxidation or the desorption or both steps at such lineal gas velocities that the powdered suspended reactants are taken overhead entirely in which case separation of the suspended solid material would require a larger number of cyclone separator units and the separated solid would be transferred to the other reaction zone by a system of fluidized dip legs.

In describing our invention certain accessories such as pumps, blowers, valves, etc., readily recognized as necessary by those skilled in the art, have been omitted for the sake of brevity and clarity.

Obviously many modifications and variations of the invention, as hereinabove set forth, may be made without departing from the spirit and scope thereof and therefore only such limitations should be imposed as are indicated in the appended claims.

We claim:

1. The process for the production of oxygen comprising the steps of (1) introducing in a stream of air to a reaction zone a mixture consisting of potassium chloride, cupric chloride and cuprous chloride mounted on a powdered synthetic refractory oxide gel support, (2) adjusting the linear velocity of the stream of air in said reaction zone within the limits of from about 0.25 to 5.0 feet per second whereby the suspended gel-supported mixture is caused to settle to a relatively dense fluidized bed, (3) maintaining the temperature in said fluidized bed within the range of from about 325° C. to about 425° C., thereby maintaining on the surface of the gel support a liquid film of the chloride mixture, (4) adjusting the residence time for said gel supported mixture in said fluidized bed to cause absorption of not less than one-twentieth mole of oxygen per mole of cuprous chloride in said mixture, (5) continuously separating the gel-supported oxygen enriched mixture from the oxygen depleted air stream, (6) continuously circulating the supported oxygen enriched supported mixture in suspension in a gas to a second reaction zone and maintaining therein the gas velocity within the range stipulated in step 2 to maintain a second fluidized bed of gel supported reactant, (7) maintaining the temperature within the fluidized bed of step 6 within the range of from about 425° C. to 550° C. and at least 25° C. higher than the maximum temperature in the fluidized bed of step 2 to desorb oxygen from powdered gel-supported mixture, (8) continuously separating the desorbed supported mixture from the desorbed oxygen and continuously recycling said desorbed mixture suspended in air to step 1, and (9) recovering desorbed oxygen from step 8 of the process.

2. A continuous process for the production of oxygen from a gaseous mixture containing oxygen comprising suspending an intimate mixture of the chlorides of copper and from twenty to fifty mol per cent of potassium chloride supported on a powdered solid by a stream of said gaseous mixture in a reaction zone maintained at a temperature within the range of from 325° C. to 425° C. for a period of time sufficient to absorb an appreciable amount of oxygen, continuously separating the oxygen enriched absorbent mixture from the reaction zone and circulating it to a second reaction zone, maintaining the mass suspended in said second reaction zone by a stream of oxygen while maintaining the temperature of said second reaction zone within the range of from 450° C. to 550° C. to desorb oxygen therefrom, continuously separating oxygen from the second reaction zone including that oxygen desorbed from the mass, recovering the desorbed oxygen and continuously recirculating the desorbed mass from the second reaction zone to the first reaction zone.

3. The process for the production of oxygen comprising introducing a mixture consisting of potassium chloride, cuprous chloride, and cupric chloride mounted on a powdered solid absorbent mass into a reaction zone, suspending the powdered solid in the reaction zone by an ascending stream of air, maintaining the temperature of the suspended powder within the range of from about 325° C. to about 425° C. to absorb oxygen by the cuprous chloride in said powdered solid, continuously separating oxygen enriched mixture from said reaction zone and transferring it to a second reaction zone, supporting the powdered solid in the second reaction zone by an ascending stream of gas of the group consisting of carbon dioxide, oxygen and steam and mixtures thereof while maintaining a temperature within the range of from 475° C. to 525° C. to desorb oxygen from the powdered mixture, continuously withdrawing gas from the second reaction zone and recovering the desorbed oxygen, and continuously recycling the desorbed mixture from the second reaction zone to the first reaction zone.

4. The process of claim 3 in which the suspending gas stream in the second reaction zone is oxygen.

5. The process for the production of oxygen comprising introducing a mixture consisting of potassium chloride, cuprous chloride, and cupric chloride mounted on a powdered solid absorbent mass into a reaction zone, suspending the powdered solid in the reaction zone by an ascending stream of air, maintaining the temperature of the suspended powder within the range of from about 325° C. to about 425° C. and a pressure within the range of from about 5 atmospheres to about 10 atmospheres to absorb oxygen by the cuprous chloride in said powdered solid, continuously separating oxygen enriched mixture from said reaction zone and transferring it to a second reaction zone, supporting the powdered solid in the second reaction zone by a gas stream consisting of a gas of the group consisting of carbon dioxide, oxygen and steam and mixtures thereof while maintaining a temperature within the range of from 425° C. to 550° C. and atmospheric pressure to desorb oxygen from the powdered mixture, continuously withdrawing gas from the second reaction zone and recovering the desorbed oxygen, and continuously recycling the desorbed mixture from the second reaction zone to the first reaction zone.

6. The process of claim 5 in which the suspending gas stream in the second reaction zone consists of oxygen.

7. The process for the production of oxygen comprising introducing a mixture consisting of potassium chloride, cuprous chloride, and cupric chloride mounted on a powdered solid absorbent mass into a reaction zone, suspending the powdered solid in the reaction zone by an ascending stream of air, maintaining the temperature of the suspended powder within the range of from about 325° C. to about 425° C. and a pressure of from about 5 atmospheres to about 10 atmospheres to absorb oxygen by the cuprous chloride in said powdered solid, continuously separating oxygen enriched mixture from said reaction zone and transferring it to a second reaction zone, supporting the powdered solid in the second reaction zone by an ascending stream of gas of the group consisting of carbon dioxide, oxygen and steam and mixtures thereof while maintaining a temperature within the range of from 450° C. to 550° C. and a pressure of from 10 to 50 pounds gage per square inch to desorb oxygen therefrom, continuously withdrawing gas from the second reaction zone and recovering the desorbed oxygen and continuously recycling the powdered mixture from the second reaction zone to the first reaction zone.

8. A process for the production of oxygen from air which comprises continuously circulating a powdered contact mass impregnated with 20 to 65 per cent by weight of metallic chlorides the major portion of which is cuprous chloride suspended by a stream of air through a reaction zone maintained at a temperature within the range of from 325° C. to about 425° C. and a pressure of from about 1 to about 10 atmospheres to convert a substantial portion of the cuprous chloride to cupric oxychloride, continuously separating the oxygen enriched contact mass from said reaction zone and transferring it to a second reaction zone, supporting the contact mass in the second reaction zone by an ascending stream of gas of the group consisting of carbon dioxide, oxygen and steam and mixtures thereof while maintaining a temperature within the range of from 450° C. to 550° C. and atmospheric pressure to desorb oxygen therefrom, continuously withdrawing gas from the second reaction zone and recovering the desorbed oxygen therefrom, and continuously recycling the desorbed powdered contact mass from the second reaction zone to the first reaction zone.

9. The process of claim 8 in which the suspending gas stream in the second reaction zone is oxygen.

10. A process for the production of oxygen from air which comprises continuously circulating a powdered contact mass impregnated with from 20 to 65 per cent by weight of metallic chlorides a major portion of which is cuprous chloride suspended by a stream of air through a reaction zone maintained at a temperature within the range of 325° C. to about 425° C. and a pressure of from about 5 to about 10 atmospheres to convert a substantial portion of the cuprous chloride to cupric oxychloride, continuously separating the oxygen enriched contact mass from said reaction zone and transferring it to a second reaction zone, supporting the contact mass in the second reaction zone by an ascending stream of gas of the group consisting of carbon dioxide, oxygen and steam and mixtures thereof while maintaining a temperature within the range of from 425° C. to 550° C. and atmospheric pressure to desorb oxygen therefrom, continuously withdrawing gas from the second reaction zone and recovering the desorbed oxygen therefrom, and continuously recycling the desorbed powdered contact mass from the second reaction zone to the first reaction zone.

11. The process of claim 10 in which the powdered contact mass is a natural clay of a particle size within the range of from 10 microns to 20 mesh.

12. The process of claim 10 in which the support for the powdered contact mass is a finely divided silica gel of a particle size within the range of from 10 microns to 20 mesh.

CELESTE M. FONTANA.
EVERETT GORIN.

REFERENCES CITED

The following references are of record in the file of this patent:

UNITED STATES PATENTS

| Number | Name | Date |
|---|---|---|
| 73,540 | Mallet | Jan. 21, 1868 |
| 945,048 | Ridley | Jan. 4, 1910 |
| 1,091,023 | Larsen | Mar. 24, 1914 |
| 1,124,304 | Danckwardt | Jan. 12, 1915 |
| 1,984,380 | Odell | Dec. 18, 1934 |
| 2,204,733 | Miller | June 18, 1940 |
| 2,206,399 | Grosvenor et al. | July 2, 1940 |
| 2,299,427 | Rosenstein | Oct. 20, 1942 |
| 2,304,827 | Jewell | Dec. 15, 1942 |
| 2,418,402 | Gorin | Apr. 1, 1947 |
| 2,418,930 | Gorin | Apr. 15, 1947 |

FOREIGN PATENTS

| Number | Country | Date |
|---|---|---|
| 2,934 | Great Britain | of 1865 |

OTHER REFERENCES

Lunge: "Manufacture of Sulfuric Acid and Alkali," vol. III, third ed. (Gurney & Jackson, London, 1911), pp. 449, 469–70 and 489.

Certificate of Correction

Patent No. 2,490,587                                                        December 6, 1949

CELESTE M. FONTANA ET AL.

It is hereby certified that errors appear in the printed specification of the above numbered patent requiring correction as follows:

Column 8, line 18, for "pounds' " read *pounds*; line 48, for "relaized" read *realized*; column 9, line 15, after the word "oxidation" insert *step*; line 16, after "desorption" insert *step*; column 12, line 26, after the claim reference numeral "10" for the letter "n" read *in*;

and that the said Letters Patent should be read with these corrections therein that the same may conform to the record of the case in the Patent Office.

Signed and sealed this 2nd day of May, A. D. 1950.

[SEAL]

THOMAS F. MURPHY,
*Assistant Commissioner of Patents.*